(12) United States Patent
Cartan et al.

(10) Patent No.: US 11,669,347 B2
(45) Date of Patent: Jun. 6, 2023

(54) GENERATING VIDEO SEQUENCES FROM USER INTERACTIONS WITH GRAPHICAL INTERFACES

(71) Applicant: Oracle International Corporation, Redwood Shores, CA (US)

(72) Inventors: John Cartan, Alameda, CA (US); Benjamin Warren Bendig, San Mateo, CA (US); Robert Philip Spunt, Seattle, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 15 days.

(21) Appl. No.: 17/196,628

(22) Filed: Mar. 9, 2021

(65) Prior Publication Data

US 2022/0291931 A1 Sep. 15, 2022

(51) Int. Cl.
*G06F 9/451* (2018.01)

(52) U.S. Cl.
CPC .................... *G06F 9/451* (2018.02)

(58) Field of Classification Search
CPC .. G06F 9/451; G06F 2201/86; G06F 11/3438; G06F 11/3476; G06F 11/323
See application file for complete search history.

(56) References Cited

U.S. PATENT DOCUMENTS

| | | | | |
|---|---|---|---|---|
| 11,061,650 | B2* | 7/2021 | Turek | G06N 3/0445 |
| 2004/0027890 | A1* | 2/2004 | Nakanishi | H04N 9/8205 |
| | | | | 365/202 |
| 2009/0187860 | A1* | 7/2009 | Fleck | G06F 3/04883 |
| | | | | 715/834 |
| 2010/0138360 | A1* | 6/2010 | Cutler | G06Q 40/06 |
| | | | | 705/36 R |
| 2015/0046809 | A1* | 2/2015 | O'Donoghue | G06F 40/169 |
| | | | | 715/716 |
| 2015/0046909 | A1* | 2/2015 | Ligman | G06F 11/3688 |
| | | | | 717/131 |
| 2015/0091940 | A1* | 4/2015 | Emori | H04N 1/00204 |
| | | | | 345/629 |
| 2018/0184165 | A1* | 6/2018 | Maughan | H04N 21/44222 |
| 2020/0159549 | A1* | 5/2020 | Chen | G06F 9/453 |

* cited by examiner

*Primary Examiner* — Michael Roswell
(74) *Attorney, Agent, or Firm* — Kilpatrick Townsend & Stockton LLP

(57) ABSTRACT

A video sequence may be generated that animates user interactions across a number of different user interfaces for an application. Visual representations of the user interfaces can be combined together into an image that acts as a canvas or background for the video sequence. A record of user interactions with the user interfaces can be mapped to locations on the canvas, and the video sequence can be generated that incrementally animates user actions as they move between different containers or controls in the user interfaces. The animation may show individual users or aggregated user groups represented by graphics that move across the user interfaces to form a path represented by connectors and arcs.

20 Claims, 14 Drawing Sheets

Edit My Details: Contact Information

110 — Save and Close | Cancel — 108

Contacts +

| Primary | Type | Details |
|---|---|---|
| ✉ | Work Phone ▸ | 555-555-4456 |
| ✉ | Work Email ▸ | Bob.Smith@ACME.com |

Address +

Primary Mailing  Home Address: 123 Green Acre Pkwy, Redwood City, CA, 94065, United States

102 ✎  104 ✗  106 ▸

| *Type | | Type | Home Address |
|---|---|---|---|
| *Effective Start Date | 01/20/2021 📅 | Effective Start Date | 07/27/01 |
| *Country | Untied States ▸ | Country | United States |
| *Address Line 1 | | Address Line 1 | 300 Elm Street |
| *Address Line 2 | | Address Line 2 | Redwood City, CA |
| *Address Line 3 | | | |
| *City | ▸ | City | Redwood City |
| *State | ▸ | State | |
| *ZIP Code | ▸ | ZIP Code | 94065 |
| *Tax District | ▸ | Tax District | |
| *Country | ▸ | Country | |

| Count | Med Time | Origin | Dest | Click | Start Container | Coord | End Container | Coord | Journey |
|---|---|---|---|---|---|---|---|---|---|
| 89 | 10 | edit on my details | contact information - edit mailing address - pencil | 1 | My Details | (23, 4) | Edit My Details - Contact information | (10, 13) | 848-3 |
| 89 | 17 | contact information - edit mailing address - pencil | save and close edit details | 2 | Edit My Details - Contact information | (23, 4) | Edit My Details - Contact information | (21, 1) | 848-3 |
| 58 | 11.5 | edit on my details | contact information - edit mailing address - pencil | 1 | My Details | (23, 4) | Edit My Details - Contact information | (10, 13) | 848-2 |
| 58 | 17.5 | contact information - edit mailing address - pencil | cancel edit details | 2 | Edit My Details - Contact information | (10, 13) | Edit My Details - Contact information | (24, 1) | 848-2 |
| 58 | 1 | cancel edit details | Cancel warning popup | 3 | Edit My Details - Contact information | (24, 1) | Cancel warning | (7, 1) | 848-2 |
| 58 | 5 | Cancel warning popup | Cancel warning yes | 4 | Cancel warning | (7, 1) | Cancel warning | (14, 2) | 848-2 |
| 33 | 9 | edit on my details | create new address | 1 | My Details | (23, 4) | Edit My Details - Contact information | (3, 11) | 2209-1 |
| 33 | 21 | create new address | cancel edit details | 2 | Edit My Details - Contact information | (3, 11) | Edit My Details - Contact information | (24, 1) | 2209-1 |
| 33 | 1 | cancel edit details | cancel warning popup | 3 | Edit My Details - Contact information | (24, 1) | Cancel warning | (7, 1) | 2209-1 |
| 33 | 4 | cancel warning popup | cancel warning yes | 4 | Cancel warning | (7, 1) | Cancel warning | (14, 2) | 2209-1 |
| 12 | 20 | edit on my details | contact information - edit mailing address - pencil | 1 | My Details | (23, 4) | Edit My Details - Contact information | (10, 13) | 11029-1 |
| 12 | 9.5 | contact information - edit mailing address - pencil | cancel create new address | 2 | Edit My Details - Contact information | (10, 13) | Edit My Details - Contact information | (10, 13) | 11029-1 |
| 12 | 6.5 | cancel create new address | cancel edit details | 3 | Edit My Details - Contact information | (10, 13) | Edit My Details - Contact information | (24, 2) | 11029-1 |
| 12 | 1 | cancel edit details | cancel warning popup | 4 | Edit My Details - Contact information | (24, 2) | Cancel warning | (7, 1) | 11029-1 |
| 12 | 4.5 | cancel warning popup | Cancel warning | 5 | Cancel warning | (7, 1) | Cancel warning | (14, 2) | 11029-1 |

Contact Information

Contacts ☐

| Primary | Type | Details | | |
|---|---|---|---|---|
| | Home Phone ◆ | | | 555-555-4456 |
| | Home Phone ◆ | | | 555-555-4456 |
| | Work E-Mail | Bob.Smith@acme.com | | |
| | Facebook_1 ◆ | | | |
| | LinkedIn_1 ◆ | | | |

[Save and Close] [Cancel]

Address

Primary Mailing Home Address: 123 Green Acre Pkwy, Redwood City, CA, 94065, United States

✎ 302 ✕      ✎ ✕

| | | | | |
|---|---|---|---|---|
| *Type | Home Address | | Type | Work Address |
| *Effective Start Date | 01/20/2021 | | Effective Start Date | |
| *Country | Untied States | | Country | United States |
| *Address Line 1 | 300 Elm Street | | Address Line 1 | 300 Elm Street |
| *Address Line 2 | Redwood City, CA | | Address Line 2 | Redwood City, CA |
| *Address Line 3 | | | City | |
| *City | Redwood Shores ▶ | | State | |
| *State | CA ▶ | | ZIP Code | |
| *ZIP Code | 94055 ▶ | | Tax District | |
| *Tax District | ▶ | | Country | |
| *Country | ▶ | | | |

┌─ Custom Fields ─ 308 ─┐
│ Post Code              │
│ Address Line 4         │
└────────────────────────┘

Contact Information

Contacts

| Primary | Type | Details | | |
|---|---|---|---|---|
| ☐ | Home Phone ⇔ | | | 555-555-4456 |
| | Home Phone ⇔ | | | 555-555-4456 |
| | Work E-Mail | Bob.Smith@acme.com | | |
| | Facebook_1 ⇔ | | | |
| | LinkedIn_1 ⇔ | | | |

Address

Primary Mailing  Home Address: 123 Green Acre Pkwy, Redwood City, CA, 94065, United States 402 🗨  ✖   ✎   Type: Work Address ▲

| | | | |
|---|---|---|---|
| *Type | Home Address | Effective Start Date | |
| *Effective Start Date | 01/20/2021 | Country | United States |
| *Country | Untied States | Address Line 1 | 300 Elm Street |
| *Address Line 1 | 300 Elm Street | Address Line 2 | Redwood City, CA |
| *Address Line 2 | Redwood City, CA | | |
| *Address Line 3 | | City | |
| *City | Redwood Shores ▶ | State | |
| *State | CA ▶ | ZIP Code | |
| *ZIP Code | 94055 ▶ | Tax District | |
| *Tax District | ▶ | Country | |
| *Country | ▶ | | |

┌─ Custom Fields ─────┐
│ Post Code           │
│ Address Line 4      │
└─────────────────────┘

Save & Close    Cancel — 404

GENERATING VIDEO SEQUENCES FROM USER INTERACTIONS WITH GRAPHICAL INTERFACES

BACKGROUND

Most modern computing systems use graphical user interfaces (GUIs) to receive user inputs and provide user outputs. GUIs use graphical icons such as buttons, text boxes, text fields, drop-down menus, drag-and-drop graphics, and other types of controls as the primary components for facilitating user interactions. The use of GUIs has evolved from desktop computing to handheld and other nontraditional computing devices such as smart phones, gaming devices, smart phones, smart appliances, industrial controls, and virtually any other device with a user interface. Generally, GUIs are considered to be the most user-friendly form of user interface, as they use visual, graphical indications and provide immediate feedback from user interactions.

Despite the ease with which most GUIs are used, even graphical interactions may become very complex in modern systems. GUIs are often not limited to a single interface, but instead may include multiple windows, forms, pop-ups, warning messages, confirmation messages, and so forth. For example, filling out a simple web form may generate additional interfaces that allow the user to edit information, warning windows for performing certain actions, confirmation windows for submitting data, additional detail windows for providing in-depth information, and/or other complications. Therefore, the user journey through a series of graphical user interfaces may be far from linear. When a user does not complete an action provided by the GUI, it may often be difficult to understand the precise point in the process that confused the user to the point of abandoning the task. Therefore, improvements in the art are needed.

BRIEF SUMMARY

In order to improve the design and functionality of user interfaces for computerized systems, is important to understand the experiences of users as they move between user interfaces. Interface designers can only improve the user journey if they understand where users experience frustration or confusion, where they make mistakes or wrong turns when entering information, what steps they take to recover and complete a task, how different users can accomplish a task in different ways, along with many other aspects hidden in the details of the user experience. These questions are hard to answer without "looking over the shoulder" of each individual user as they work. Specialized equipment such as eye tracking software can be invasive and costly, and thus does not present a practical solution to understanding the intricacies of the user journey.

Described herein are embodiments for generating a video sequence that animates user interactions across a number of different user interfaces for an application. Visual representations of the user interfaces can be combined together into an image that acts as a canvas or background for the video sequence. A record of user interactions with the user interfaces can be mapped to locations on the canvas, and the video sequence can be generated that incrementally animates user interactions as they move between different containers or controls in the user interfaces. The animation may show individual users or aggregated user groups represented by graphics that move across the user interfaces to form a path represented by connectors and arcs. The video sequence may be used to highlight areas of confusion or infer other user problems to improve the design of the user interfaces.

The user interfaces may be configured to register events at a server, and these events may be stored in an event log at the server. The event log of user interactions may be parsed to generate a "user journey" or progression of path segments from one user interface container/control to another for each user session. These individual path segments can be aggregated across multiple users to generate an overall journey table that describes user interactions with a collection of user interfaces. This allows user journeys to be evaluated individually and collectively to better understand the interactions with the interfaces.

To present a collective view of the user interface experience, each of the user interfaces may be used to generate interface images. Some implementations may use simple screenshots, while other implementations may scrape the display code (e.g. HTML) to identify containers, controls, and corresponding locations. The display code may then be used to generate wireframe or scaler vector graphic images for each of the user interfaces. The images of the individual interfaces can be combined in a single image or canvas to be used as a background for the animation of the video sequence. The individual interface images may be arranged on the canvas such that the user interactions predominantly flow in a single direction. The individual interface images may also be sized and/or positioned based on the number of user interactions.

Locations in the image or canvas used as a background may be mapped to the events in the event log and/or user journey table. For example, local coordinates for each container can be associated with functions or events generated in the code for those containers. The functions or events can be mapped to the events recorded at the server, and thus each segment in the user journey path may be mapped to a location in the canvas.

A video sequence that animates user interactions at those locations on the image of the user interfaces may be generated for single and/or aggregate users. Interactions on the canvas may be illustrated with graphical icons such as circles or spheres, and paths between user interface elements may be connected with arcs or connectors. The animation may gradually draw these arcs or connectors between user interface elements to show how user interactions progress through a user session. The connector and/or graphical indicator size, color, etc., may be displayed based on the underlying number of users performing those actions. The resulting video sequence animation provides both individual and overall views of user interactions to refine the user interface design.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 1 illustrates a user interface, according to some embodiments.

FIG. 2 illustrates a table that stores path segments of a user journey, according to some embodiments.

FIG. 3 illustrates a wireframe image of a user interface, according to some embodiments.

FIG. 4 illustrates how locations on the wireframe image may be determined for potential user interactions, according to some embodiments.

FIG. 6A illustrates a frame from a video sequence that animates the user actions between locations on the canvas, according to some embodiments.

DETAILED DESCRIPTION

Figure 5:
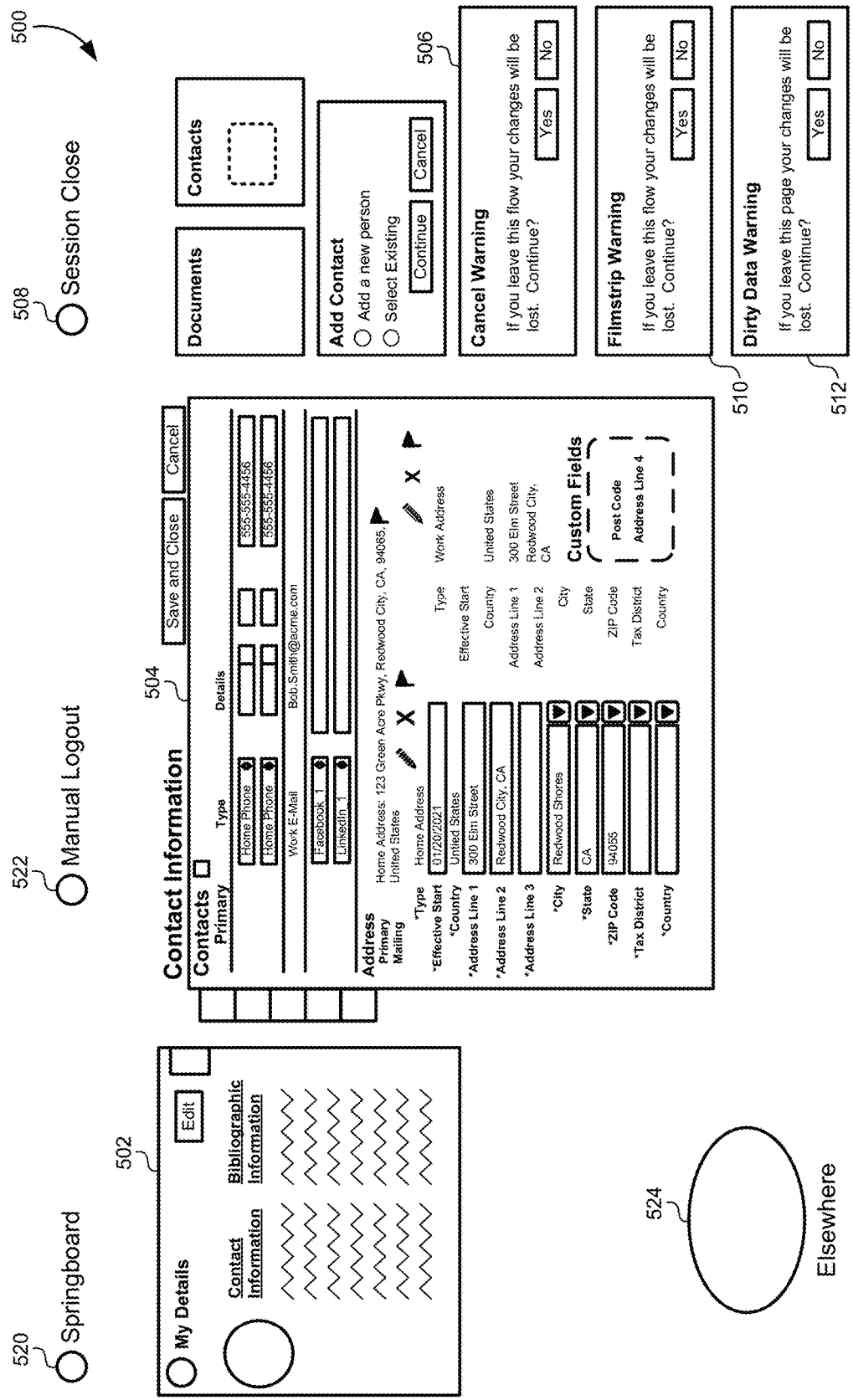
FIG. 5 illustrates an example of an image of a plurality of user interfaces that may be used as a backgrounder canvas for animating the video sequence of the user journey, according to some embodiments.

Described herein are embodiments for generating a video sequence that animates user interactions across a number of different user interfaces for an application. Visual representations of the user interfaces can be combined together into an image that acts as a canvas or background for the video sequence. A record of user interactions with the user interfaces can be mapped to locations on the canvas, and the video sequence can be generated that incrementally animates user actions as they move between different containers or controls in the user interfaces. The animation may show individual users or aggregated user groups represented by graphics that move across the user interfaces to form a path represented by connectors and arcs. The video sequence may be used to highlight areas of confusion or infer other user problems to improve the design of the user interfaces.

FIG. 1 illustrates a user interface 100, according to some embodiments. The user interface 100 may include a plurality of controls that facilitate user inputs and/or user outputs. The plurality of controls may include text displays, text input boxes, drop-down menus, checkboxes, tabs, buttons, radio buttons, and so forth. In this particular example, the user interface 100 may also include an edit control 102, a cancel controls 104, 108 a session close control 106, and/or a save and close control 110.

The user interface 110 illustrated in FIG. 1 may be considered a single user interface, which may be separate and distinct from other user interfaces that may be displayed in a user session with a software application. For example, when a user selects the edit control 102, this action may generate another user interface, such as a web form or a pop-up window that allows the user to enter additional information or edit existing information displayed in the user interface 110. Similarly, selecting the save and close control 110 may cause the user interface 102 be removed and revert back to a previous user interface for displaying user information. Each window, pop-up, web form, and interface may be interpreted herein as separate user interfaces.

The separate user interfaces, including user interface 100, may be displayed as part of a unified user experience that is referred to herein as a "user journey." A user journey may include any of the interactions between the user and one or more user interfaces that are presented during a user session with a software application. For example, the user journey may be characterized by a sequence of user interactions such as clicking buttons, selecting text, entering text, and/or other user interface actions in which the user participates during an interactive session with a software application. The user journey may extend across a plurality of user interfaces that are progressively presented to the user. For example, clicking a button on a first user interface may generate a second user interface that is placed over the first user interface (e.g., a modal window). The user may then interact with the second user interface to return back to the first user interface, or possibly generate subsequent user interfaces that are presented on a display device. Therefore, the user journey may include a series of user interactions through a plurality of different user interfaces.

In order to improve the design and functionality of user interfaces for computerized systems, is important to understand the experiences of users as they move between user interfaces. Interface designers can only improve the user journey if they understand where users experience frustration or confusion, where they make mistakes or wrong turns when entering information, what steps they take to recover and complete a task, how different users can accomplish a task in different ways, along with many other aspects hidden in the details of the user experience. These questions are hard to answer without "looking over the shoulder" of each individual user as they work. Specialized equipment such as eye tracking software can be invasive and costly, and thus does not present a practical solution to understanding the intricacies of the user journey.

Therefore, a technical problem exists in the art of user interfaces. Specifically, user interactions with a user interface are typically received as events at a server. For example, a server may receive an event indicating that a user entered information into a particular text box that was submitted at a particular time. In another example, the server may receive an event indicating that the user clicked a submit button at a particular time. These events are typically processed as they are received at the server, which defines the extent of which these events are processed. No current tools exist for processing these events and generating a visualization that replays the user journey, either from the perspective of a single user or from the perspective of multiple users.

The embodiments described herein solve this technical problem and other problems specific to the art of computing by processing user interactions received through one or more user interfaces to generate an animated video sequence that walks through the user experience with the user interfaces. The events received by a computer system may be recorded as user interactions with one or more user interfaces. The display code for the user interfaces can be scraped to identify containers or controls in the user interfaces. This information can be used to generate wireframe images for each of the user interfaces that can be combined together into a single image. Locations in the image may be determined for each of the recorded user interactions. A video sequence that recreates the user interactions at the locations on the image of the user interfaces may then be generated. As shown in detail in the figures described below, a user journey may be represented by an animated traversal of paths between controls or containers on the user interfaces as those paths are traversed by individual users and aggregate groups of users.

The video sequence that animates the user interactions improves the functioning of the user interfaces, and thus the functioning of the computer system itself, in a number of ways. The animation can highlight common mistakes or wrong turns made by users during the user journey. This information can be used to directly influence the design of the user interface and prevent such missteps by the user. Furthermore, the improvements to the user interface that are made possible through the embodiments described herein reduce the user errors that are propagated to databases at a server. For example, each data entry mistake made by a user that is incorrectly submitted to the server may be committed to a database. Correcting these mistakes requires rolling back committed data in the database, which reduces the availability of the database, reduces the throughput of transactions that the server can handle, and increases the drain on computing resources required to restore the database to its proper state. When common user errors are identified through the video sequence generated by these embodiments, the number of rollbacks at the server can be reduced and the functioning of the server itself may be improved.

FIG. 2 illustrates a table 200 that stores path segments of a user journey, according to some embodiments. As described above, user interactions with the user interfaces may be received by a server, backend, or other underlying computing system as events. These events may include information provided through the user interface, such as submitted text, button clicks, numerical values, and/or other information that may be provided by a user through the user interface. These events may also include a timestamp and may be associated with a particular user. In some embodiments, the events may also specify a particular control or other element of the user interface receiving the user input. A record of these events may be stored in a table of user interactions. For example, a server may record a list of user interactions as such events are registered at the server to receive data entered through the user interfaces.

Some embodiments may process the raw data in the log of user interactions to generate a user journey table, such as the table 200 illustrated in FIG. 2. Generating the table 200 may include sorting the events in the log of user interactions to identify paths that were traversed between one user interface element and a next interface element during each individual user journey. This may include grouping the user interactions by individual users, sorting those user interactions such that they are ordered in time, and identifying each path in the user journey. For example, the log of user interactions may include a first event indicating that a user clicked on a particular control in a user interface. The next event to occur in time may indicate that the user clicked on another control in a separate user interface (e.g., the separate user interface may have been generated as a result of clicking on the particular control in the first user interface). Each successive pair of events for that user may be combined to generate a path having a starting point and an endpoint as a segment of the user journey. In this example, a row in the journey table for a particular user may include a segment that begins at control A in user interface A and ends at control B user interface B. The time for traversing this particular path may be determined by subtracting the timestamp for the event at control A from the timestamp for the event at control B. This process may be carried out for each individual user to build a journey table of traversed pathways between user interface controls.

While a journey table may be built for each individual user, and the individual journey table may be used to generate a video sequence described below, some embodiments may further combine the individual user journeys from multiple users into an aggregate journey table, such as the table 200 illustrated in FIG. 2. Each row in the table 200 illustrates one path segment traversed by at least one user in a user journey. The table 200 may represent multiple user journeys, as groups of users may follow the same sequence of input events through the user interfaces. For example, the "Count" column may indicate the number of users traversing that particular segment of a user journey. The "Med Time" column may indicate the median or average time it took for users to complete that segment of the user journey (e.g., the time between clicks on the user interface elements). The "Origin" and "Dest" columns may identify specific controls or elements of the user interfaces corresponding to the start and end points of the segment. The "Click" column may be used to number the segments in a continuous user journey in order. The "Start Container" and "End Container" columns may identify specific user interface containers where the click or user interaction was received. The "Coord" column may identify a relative coordinate in the identified user interfaces where the user interaction was received. Finally, the "Journey" column may identify a particular user journey to which that segment belongs. For example, journey 848-2 includes four different segments, each of which was similarly traversed by 58 users. The table 200 may thus aggregate the individual experiences of multiple users into a single cohesive overview of how users in general respond to the user interfaces.

When populating the table 200, some embodiments may calculate a representative time between user interactions. This may be based on an average time between user interactions for each path. Other statistical measures may be used, including a median time, a mean time, outliers beyond a number of standard deviations may be removed.etc. These representative times may be used as described below in the video sequence to animate user actions between locations based on the real-world times in the table 200.

As described above, multiple tables may be used to record user interactions received through the user interfaces. For example, a log of raw data describing events from users interactions through the user interfaces may be maintained. This log of user interactions may be used to generate a journey table that organizes these raw events into segments in a cohesive user journey for single users. A journey table for single users may be maintained along with a journey table for a plurality of users where similar journeys are combined together. Some embodiments may also create tables for single users that perform substantially the same sequence of interactions across multiple user sessions. For example, a user may edit the contact information of many individuals. Consequently, the user may follow the same sequence of user interactions repeatedly for each individual. These actions may be aggregated together for a single user to generate a video sequence described below in the same way that actions are aggregated together for multiple users. These various tables, logs, and/or records may be collectively referred to as a record of user interactions with the one or more user interfaces.

The tables described above, such as table 200 may be generated using logs that are already stored at the server. Thus, the video sequences and animations described herein may be generated from data that already exists in a server log, and therefore need not require any special monitoring software or monitoring agents installed at the client devices or customer locations. Instead, the logs at the server can be centrally processed to generate the tables and/or video sequences described herein.

FIG. 3 illustrates a wireframe image 300 of a user interface, according to some embodiments. The user interface 100 in FIG. 1 appears as it may be displayed on a display device during a user session with a corresponding software application. Buttons, text, labels, graphics, controls, and/or other user interface elements may be rendered on the screen and displayed in full detail. However, these details are not necessary in some embodiments to generate the animated sequence described below. Displaying all the details of the user interface may even unnecessarily clutter the view of the animation of the user journey. Therefore, some embodiments may generate a simplified wireframe image 300 of the user interface 100 to use as a background or canvas when animating the segments of the user journey in the video sequence.

Some embodiments may use a tool that performs a "scrape" of the display code used to render the user interface 100 on the user's display device. When the display code (e.g., HTML) is accessed by the tool, the display code may be parsed to identify containers or controls in the display code. For example, HTML tags may identify containers in a user interface and/or may identify controls in a user interface. The tool may record the location and type of containers/controls in the display code and use that information to generate the wireframe image 300.

The wireframe image 300 may be generated as a vector image, such as a Scalable Vector Graphic (SVG) image that can be scaled while maintaining the outline of the containers/controls. Container/controls may be generated as simple rectangles or other shapes to appear similar to the actual rendered container/controls in the user interface 100. Some embodiments may also include text labels to identify the functionality of the controls represented by wireframe shapes. The individual SVGs for the containers/controls may be arranged using the locations from the display code of the user interface 100 to be placed in similar locations in the wireframe image 300. As illustrated in FIG. 3, the wireframe image 300 includes the containers, controls, and some of the text labels from the user interface 100.

The wireframe image 300 may be generated specifically from the user interface 100 of FIG. 1. However, this same process may be carried out for each user interface that is part of a software application. As described above, a software application may present a plurality of user interfaces to a user in succession as part of the user experience. This same process described above for generating the wireframe image 300 may be carried out for any/all of the user interfaces that may be presented to a user as part of a session with a software application. For example, wireframe images may be created for pop-up windows, confirmation windows, editing windows, error messages, and so forth. As described below, these individual wireframe images of one or more user interfaces may be combined together to form a single image of the user interfaces that act as a canvas or background for the video sequence.

In some implementations, the software application may be deployed to a customer system, such as an on-premise computing system or a cloud platform. In many software applications, the customer may be allowed to customize user interfaces to include additional controls, fields, descriptions, and/or the like. Some embodiments may add these custom fields 308 to the wireframe image 300. The custom fields 308 may be added by scraping the display code that includes the custom field 308 added by the customer. Alternatively, the wireframe image 300 may be generated centrally and the custom field 308 may be manually added by a user. Users may also be provided the option to further customize the wireframe image 300 to consolidate fields, simplify the display, eliminate unnecessary containers and/or controls, and otherwise customize the wireframe image 300 for the video sequence.

FIG. 4 illustrates how locations on the wireframe image may be determined for potential user interactions, according to some embodiments. In addition to generating the wireframe image 300, the system may also identify specific locations corresponding to inputs that may be received through each of the controls. For example, the display code (e.g., HTML) for the user interface 100 may include JavaScript or other functions that respond to clicks or other user interactions for particular controls. The names of these functions may be matched with corresponding events in the log of user interactions at the server. For example, a editButtonClick( ) function associated with an edit button control may generate an event at the server that indicates that the user clicked on the edit button. A mapping may be used between functions in the display code and identifiers in events in the log of user interactions such that the user interactions in the log of user interactions may be mapped to specific controls in the wireframe image 300.

Some embodiments may also assign coordinates in a local coordinate system for the wireframe image 300 to the user interactions and/or the endpoints for the segments in a user journey. For example, referring briefly back to FIG. 2, the table 200 includes "Coord" columns that identify coordinates in the corresponding user interfaces to use as endpoints for the segment in each row of the table 200. These coordinate fields may be populated by identifying a location of the control in the wireframe image 300 for the corresponding user interface. For example, the location 402 identified for the edit control may be assigned as a central coordinate in the graphic icon representing the edit control. In another example, the location 404 for the save and close control may be assigned as a central coordinate in a button displayed for this control. The locations for these user interactions may be used to animate the segments of each path in the user journey in the video sequence described below.

FIG. 5 illustrates an example of an image of a plurality of user interfaces that may be used as a backgrounder canvas for animating the video sequence of the user journey, according to some embodiments. As described above, images may be generated for each user interface that is part of the user journey or user session with the software application. These images may be generated as simplified wireframe images. Alternatively, these images may also be generated using screenshots or other images of the user interfaces. These individual images of the user interfaces may be displayed together in a single composite image is displayed in FIG. 5 to act as a canvas 500 for the video sequence.

The canvas 500 may include images 502, 504, 506 for user interfaces that are part of user journeys found in the table 200 described above. The canvas 500 may also include user interfaces that are part of the software application, but which are not visited by any users in the journey table 200. For example, images 510, 512 depict warning message user interfaces that are not visited by users in the journey table 200. These images 510, 512 may also be displayed as part of the canvas 500 to show that users did not visit these user interfaces with regularity.

The canvas 500 may also include representations of user actions that do not necessarily correspond to a displayed user interface. For example, a graphic 508 for a "Session Close" action may be displayed as part of the canvas 500. This graphic 508 may represent a destination coordinate in the canvas 500 corresponding to when a user closes the session with the software application. Other graphics 520, 522 may represent action such as a "Manual Logout" or a "Springboard" representing the beginning of the user session or journey. A graphic 524 may represent "Elsewhere" to capture other user actions not otherwise defined or linked to a specific user interface.

The different images of user interfaces or graphics representing user actions may be graphically arranged to create a natural flow for the video sequence that animates the user interactions. For example, the user interfaces and graphics may be automatically arranged such that the general flow of path segments in the user journey flows in a single direction (e.g., from left to right and/or from up to down). The journey table 200 may include start points and end points for each path segment from the beginning of user journey to the end of the user journey. The corresponding user interfaces may be ordered in the canvas 500 from left to right according to the order in which they are traversed by the path segments in the table 200.

The graphics and images in the canvas 500 may also be sized based on entries in the table 200. For example, image 504 representing the user interface for editing contact information is sized larger than other images or graphics representing user interfaces or actions based on the number of path segments in the table 200 that start/end on the image 504. This automatic sizing of elements in the canvas 500 may serve to draw the attention of the viewer to the most heavily trafficked user interface elements. Some embodiments may also arrange the images on the canvas 500 based on use. For example, image 504 may be placed in the center of the canvas 500 based on it being the most-used user interface in the table 200.

Various techniques may be used to space the images or graphics on the canvas 500 to generate the overall image of the user interfaces. For example, a physics technique may be used wherein each of the images in the canvas 500 are connected by virtual "springs" that are weighted according to size, use, or some other characteristic of the user interfaces. A physics simulation may then use the springs to automatically space the images and graphics in the canvas 500 by reaching an equilibrium state. Some embodiments may also remove images of user interfaces from the canvas 500 if those user interfaces are not used or infrequently used by users in the journey table 200.

Figure 6B:
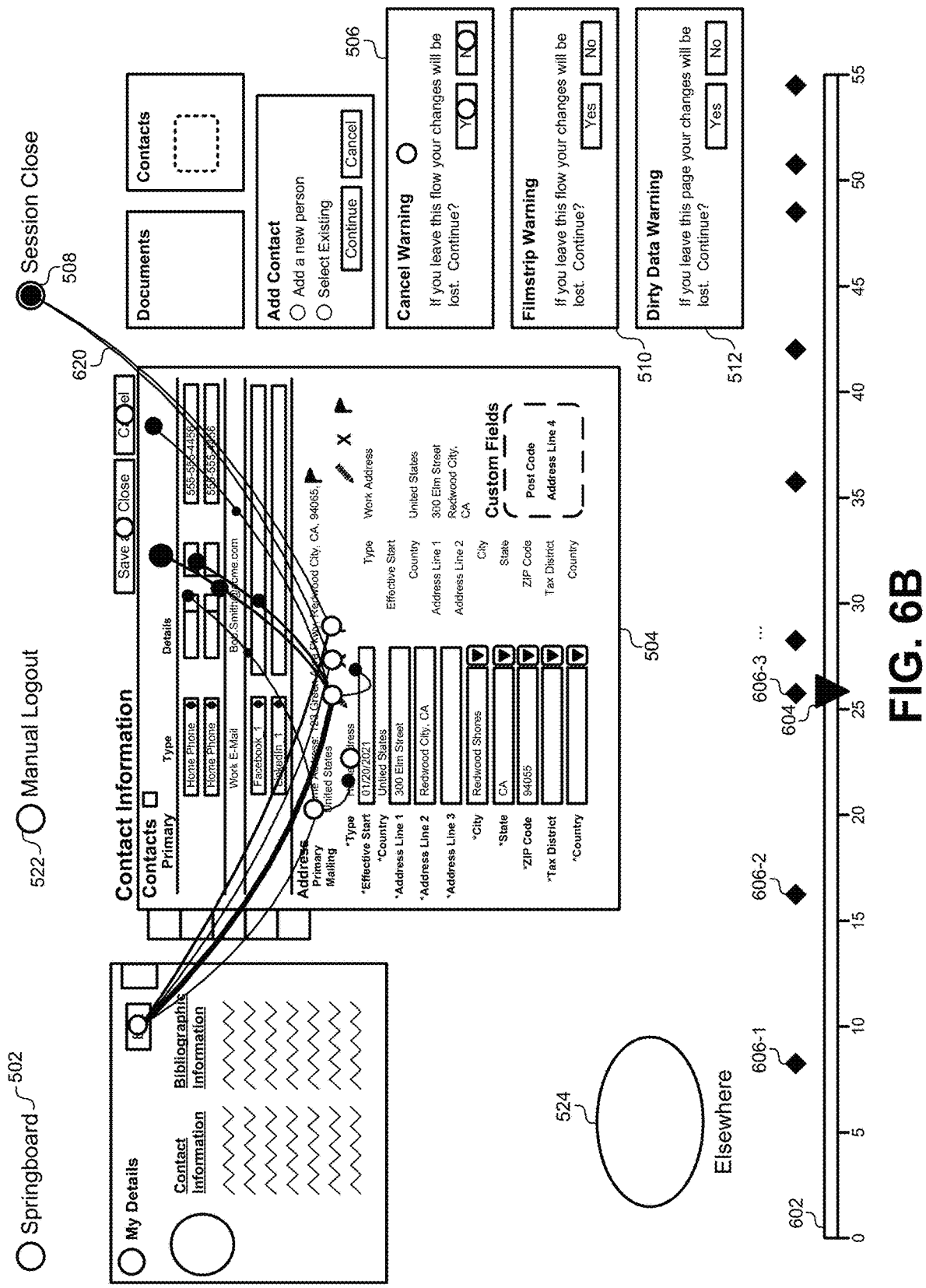
FIG. 6B illustrates a frame in a middle section of the video sequence, according to some embodiments.

FIG. 6A illustrates a frame from a video sequence that animates the user actions between locations on the canvas, according to some embodiments. Note that FIGS. 6A-6D illustrates snapshots of a continuous video sequence that may be generated. Each of these figures may represent a single frame captured at different times near the beginning, middle, and end of the video sequence. It will be understood that many additional frames may be generated for the video sequence (e.g., at 30 frames per second or other common frame rates) which cannot be practically shown in the figures. However, these representative figures show different stages of the animation that may be generated, along with the different features that may be part of the video sequence. Therefore, the individual frames in the video sequence illustrated by FIGS. 6A-6D are provided only by way of example and are not meant to be limiting.

The video sequence may animate a traversal of the different paths in the table 200 described above. In this example, graphical indicators such as spheres (e.g., 612) may represent individual users and/or groups of users that commonly traverse a path in the table 200. As the graphical indicators move from a starting point, such as the "Edit" button in the "My Details" user interface, connectors (e.g., 610) such as arcs may be gradually drawn between the starting point and graphical indicator as the graphical indicator moves from the starting point to the end point of the path. The animation of the graphical indicators and the trailing connectors that are drawn may be animated continuously from the starting point to the end point, where the path may remain in future frames and connect the starting point to the end point. This leaves each segment of the user journey displayed on the canvas 500 during the video sequence such that, at the end of the animation, the final frame may optionally display all of the path segments of all of the user journeys in their entirety.

The size, thickness, color, and/or other characteristics of the graphical indicators and the connectors that are drawn during the animation of the video sequence may be determined based on characteristics of the underlying path segment in the journey table 200. For example, the size of the graphical indicators (e.g., 612) may be proportional to the number of users following that particular path segment. Thus, the graphical indicators may be sized based on a number of users who provided user interactions at corresponding locations, either the start point or the end point as the graphical indicator traverses a connector. Similarly, the thickness of the lines representing the connectors between the graphical indicators and the start/end points may be proportional to the number of users following that particular path segment. The connectors that are animated between the start/end points and/or graphical indicators may be indicative of or show an approximate path traveled by a user's input indicator (e.g., a mouse or cursor) along the connectors.

In addition to gradually generating the connectors between the graphical indicators and the start/end points as the animation proceeds, some embodiments may also include a timeline 602 that shows the timing as the animation progresses. The time marks on the timeline 602 may indicate a real-world time between events as recorded in the journey table 200. In this example, the longest path rendered in the animation may be approximately 55 seconds. Some embodiments may scale the animation time of the video sequence to be more or less than the real time scale taken from the user journey table 200. For example, the 55 seconds used for the longest user journey in the journey table 200 may be scaled down such that the animation only lasts 15 seconds. This allows a viewer to quickly ascertain the nature of the user journeys without requiring the viewer to watch the user journeys in real time. By animating the connectors as arcs, this conveys a sense of direction to the viewer without requiring cluttering the display with arrows or other directional indicators. Additionally, the speed with which the arcs are drawn may be proportional to the speed with which users move from one user interface element to the next during their real-world experience. This allows the animation to convey indecision or confusion when users take a relatively long time to move between user interface elements, or to conversely convey decisiveness when users quickly move from one user interface container/control to another.

Various commercial software packages are available for generating the video sequence animating the user interactions between locations in the user interface image. For example, packages such as NodeBox® and OpenGL® may accept the coordinates, journey IDs, number of users, and other information from the journey table 200 and be programmed to generate the animation using the canvas 500 as a background in the video sequence. Other graphics software packages may be used to generate the video sequence without limitation.

FIG. 6B illustrates a frame in a middle section of the video sequence, according to some embodiments. A time cursor 604 may traverse the timeline 602 as the animation proceeds. Each of the diamond indicators 606 may represent an endpoint for one of the user journeys in the journey table 200. As the animation proceeds and more connectors between the start/endpoints of each path are drawn against the canvas 500, some of these user journeys may end at different times. In this example, the paths represented by connectors 620 may have clicked on a "Cancel" or "Session Close" icon in the "Contact Information" user interface represented by image 504. To signify the end of these user journeys, the connectors 620 may be animated to connect to the session close graphic 508 to visually indicate that there user journey has ended. The end of these user journeys may correspond to the diamond indicators 606-3.

Figure 6C:
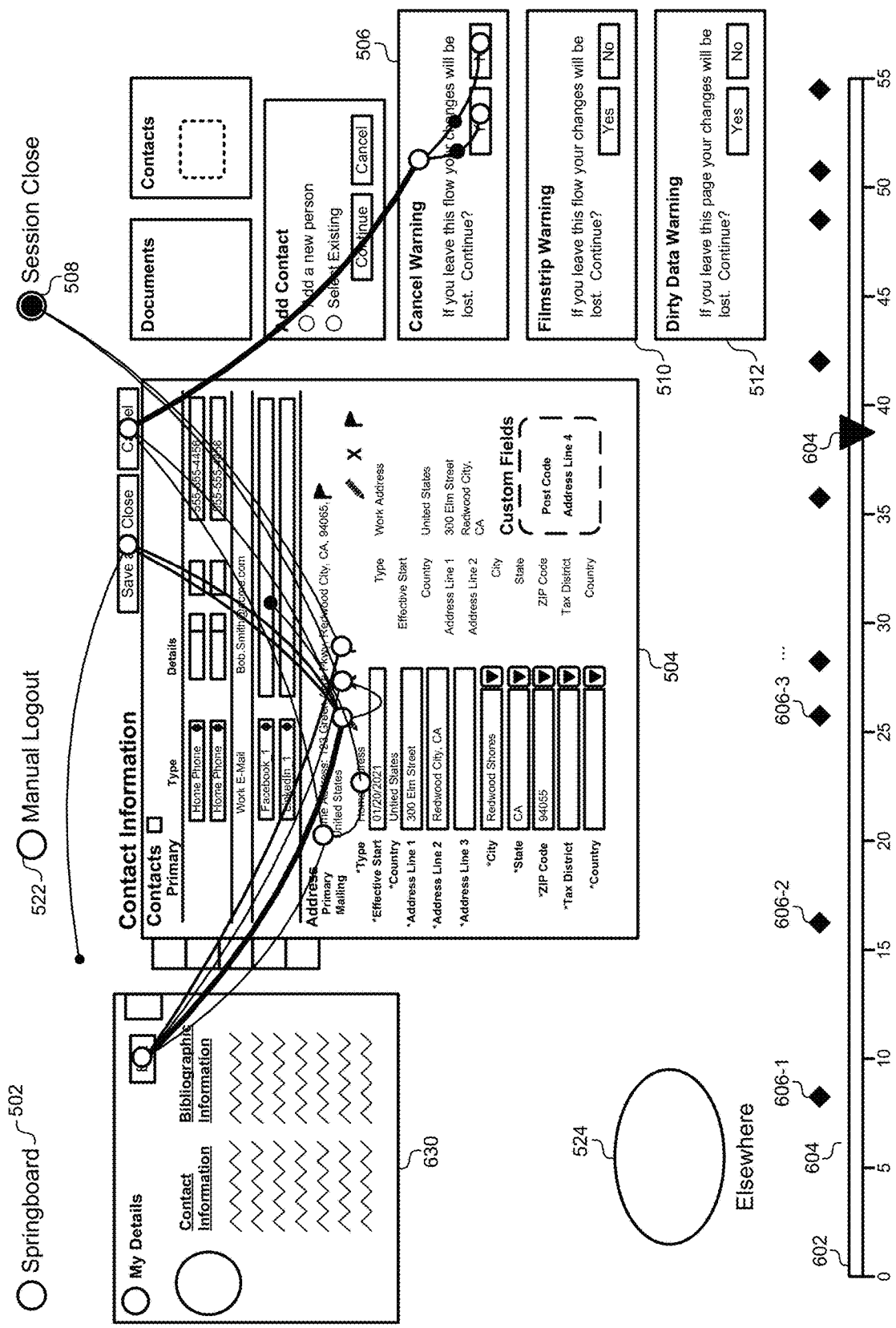
FIG. 6C illustrates a subsequent frame in the video sequence, according to some embodiments.

FIG. 6C illustrates a subsequent frame in the video sequence, according to some embodiments. Note that as the animation of the user journeys continues to progress, the connectors and start/end points on the canvas 500 remain visible. Also note that the images and graphics on the canvas used as a background have been laid out as described above such that the general flow of user interactions moves from left to right in the animation. For example, each of the paths begin on the leftmost image 630, progressing to the middle image 504, and continuing to a rightmost image 506. Although some paths (e.g., 640) may be traversed in the opposite direction from right to left, the predominant flow of the animation may progress in a single direction as illustrated in FIG. 6C. Additionally, some embodiments may lay out the elements of the canvas 500 to minimize intersections between the connectors. This may maintain a clean look that is easy for users to visually follow.

The video sequence illustrated in FIGS. 6A-6D covers multiple user journeys performed by multiple users on a same set of user interfaces. However, as described above, the record of user actions may include tables for single users in a single session, tables for single users aggregated over multiple sessions, tables for multiple users aggregated over multiple sessions and/or combinations thereof. The video sequence described herein may be generated using the same techniques for any of these different records of user interactions. Therefore, the video sequence illustrated in FIGS. 6A-6D for multiple users is provided only as one example and is not meant to be limiting.

Figure 6D:
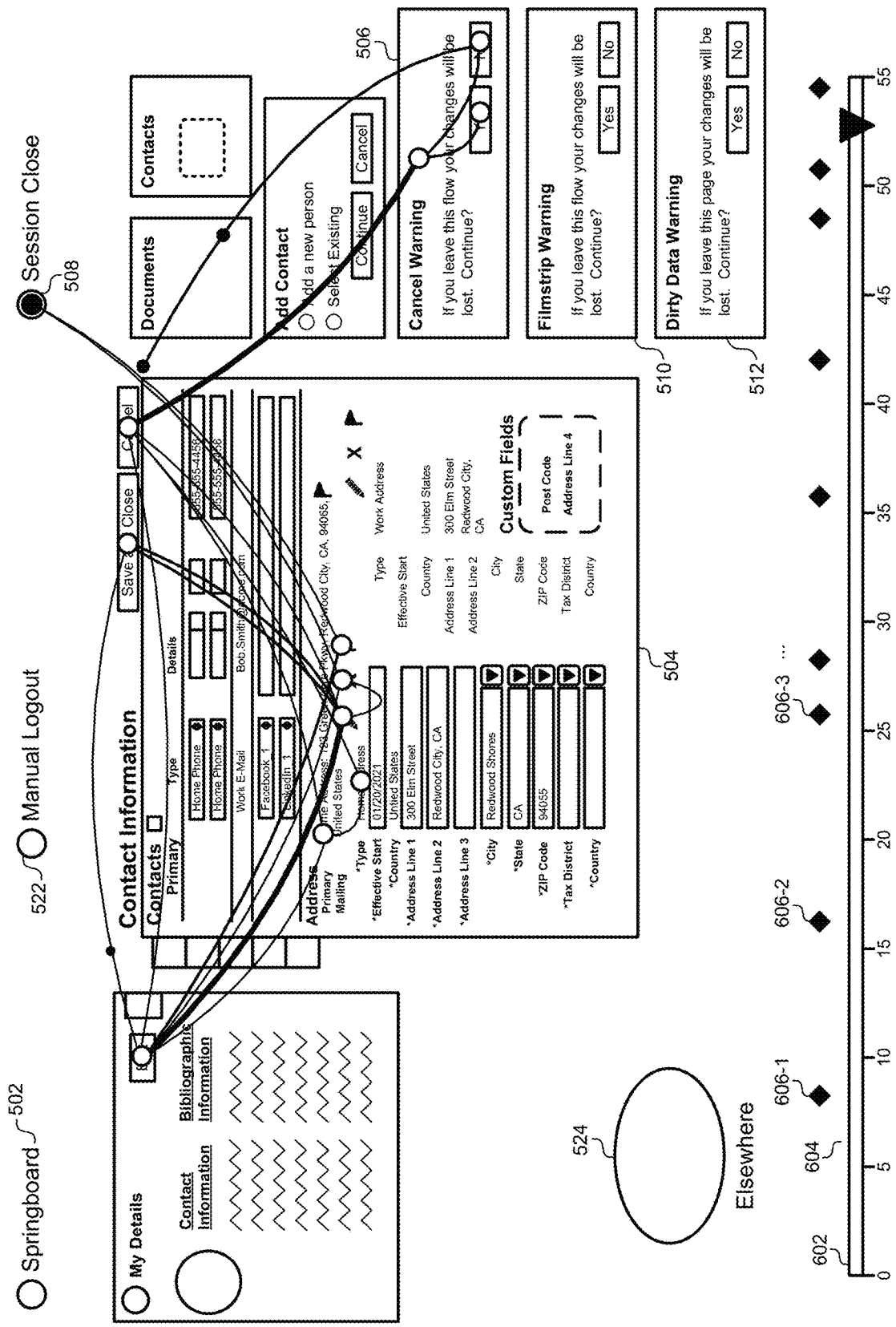
FIG. 6D illustrates one of the final frames in the video sequence, according to some embodiments.

FIG. 6D illustrates one of the final frames in the video sequence, according to some embodiments. The majority of the user journeys have completed at this point leaving the connectors with thicknesses characterizing the number of users following each path on the display. The entire video sequence can be played and replayed by a user interface designer to understand generally the flow of user interactions with one or more user interfaces. At the same time, the video sequence displays individual paths followed for each user or user group that executed substantially the same sequence of interactions with the user interfaces. This provides not only a general feel for how users interact to the user interfaces, but it also shows specific details of how individual users or user groups interact with the user interfaces.

Figure 7:
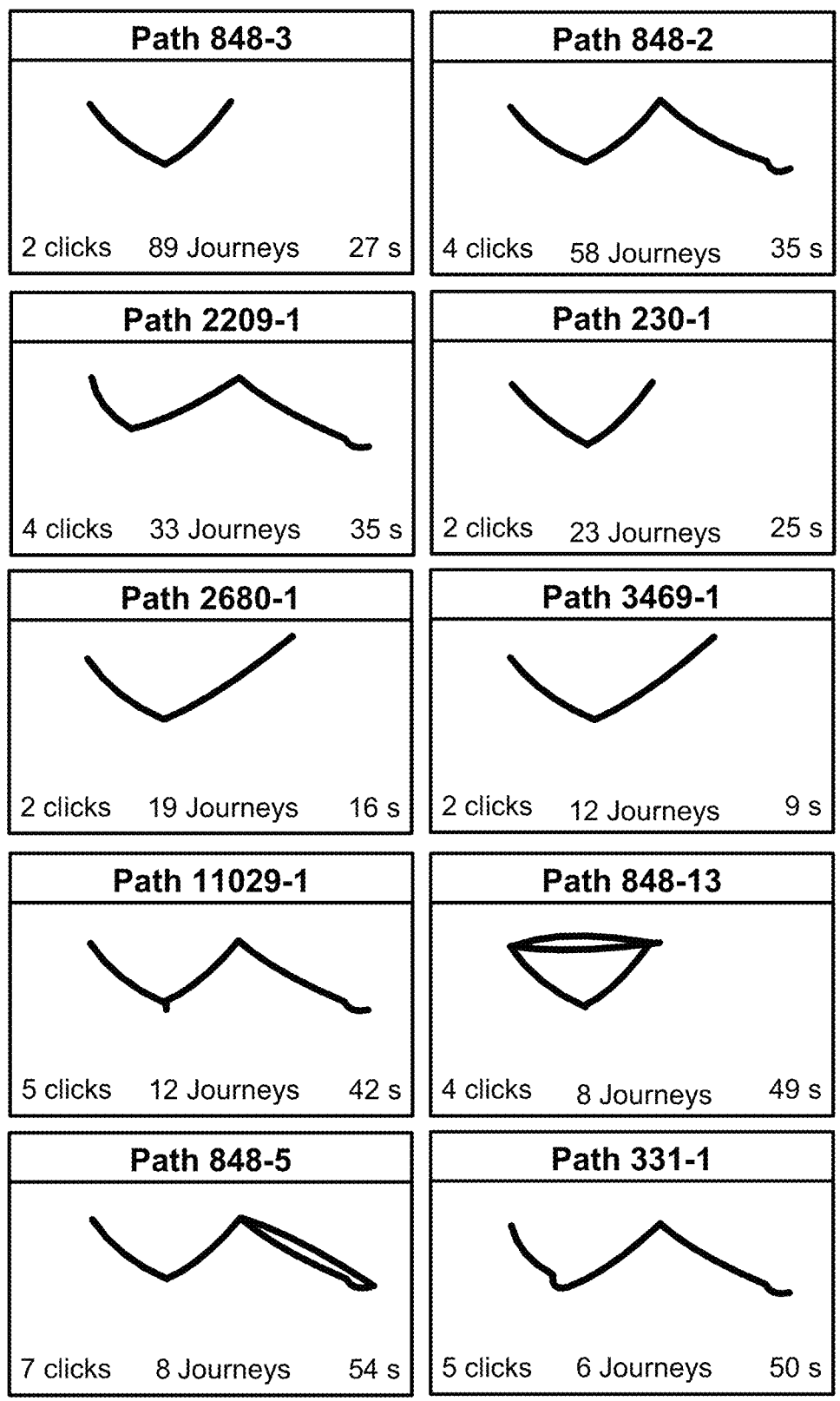
FIG. 7 illustrates a display of individual groupings of user journeys that are displayed together in the animation of the video sequence, according to some embodiments.

FIG. 7 illustrates a display of individual groupings of user journeys that are displayed together in the animation of the video sequence, according to some embodiments. As described above, multiple users may follow the same path or substantially the same path with only minor deviations in their interactions with the user interfaces. Each of these different user journeys may be displayed as thumbnails that illustrate the general appearance of the connectors for the paths as they will be displayed in their entirety in the larger video sequence display. The thumbnails in FIG. 7 may be displayed with or as part of the video sequence when it is rendered and animated. Alternatively, the thumbnails may be displayed as part of a separate user interface element. Each of the thumbnails may be further sorted/color-coded to convey additional insights into the different paths followed by different users. For example, a background color of the thumbnails may transition from red to green, dark to light, etc., indicating the number of users following that path, the time taken to complete that path, and/or any other characteristic of the path.

Various filtering options may be available before the video sequence is rendered in order to selectively highlight certain types of information and/or to simplify the rendering process. For example, before the video sequence is rendered, the journey table 200 may be filtered by user, by time, by application, by number of stops in the user journey, by user interfaces used in the user journey, by date, and/or by any other characteristic of the user journeys stored in the table 200. For example, the record of user interactions may be filtered based on a subset of users or user interfaces before generating the video sequence. Some embodiments may also filter the table by constructing example paths. For example, a user may specify a sequence of containers/controls on the user interfaces of the canvas and filter the record of user interactions to identify user journeys that follow a sequence of user interactions with the specified containers/controls. By applying these filters to the record of user interactions prior to generating the rendered video sequence, the process for generating the video sequence may be greatly simplified, and the overall time required to render the video sequence may be greatly reduced. This allows different movies to be generated for the same set of user interfaces, each depicting different situations of interest to the user interface designer. Video sequences may also be exported as standalone movies (e.g., .mpeg, .wma, etc.) to be shared or incorporated in other documents or presentations.

Figure 8:
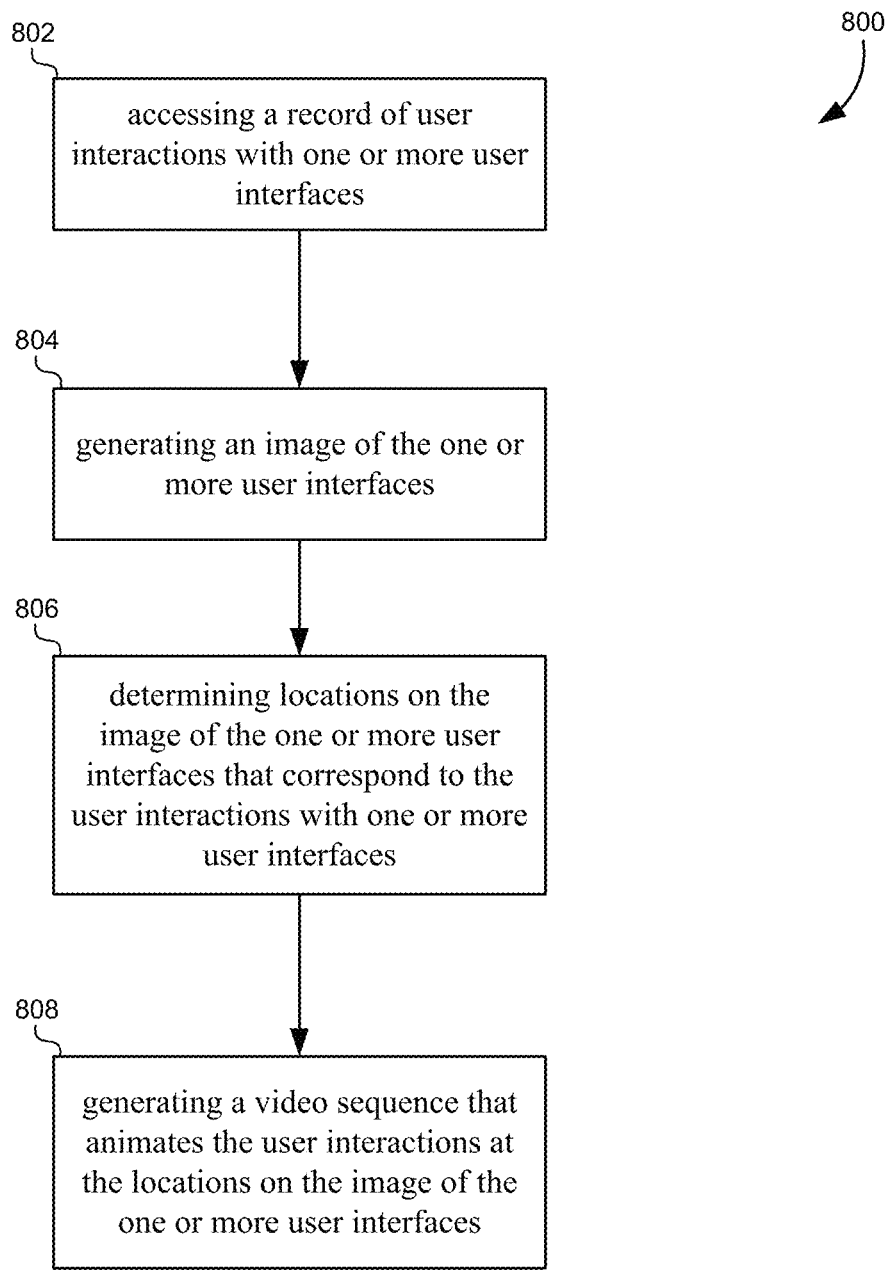
FIG. 8 illustrates a flowchart of a method of representing interactions between users and user interfaces, according to some embodiments.

FIG. 8 illustrates a flowchart 800 of a method of representing interactions between users and user interfaces, according to some embodiments. The method may include accessing a record of user interactions with one or more user interfaces (802). The record of user interactions may include events stored in a log on a server and/or a journey table comprised of individual paths that are followed by one or more users. The event log at the server may be processed and sorted to generate the journey table. The user interfaces may be part of a software application that is deployed on client devices in communication with a server, and the user interfaces may generate events that are logged by the server when data is submitted from the user interfaces to the server. The record of user interactions and the one or more user interfaces are described throughout this disclosure above, including in the description of FIGS. 1-2.

The method may also include generating an image of the one or more user interfaces (804). Wireframe images (e.g., SVGs) and/or screenshots of the individual user interfaces may be combined to form the overall image. The image of the one or more user interfaces may form a canvas or background for the video sequence. In some embodiments, display code for the one or more user interfaces may be scraped to identify containers and/or controls. The locations and shapes of these containers/controls can be used to generate wireframe images (e.g., SVGs) that can be used to re-create a wireframe version or image of the corresponding user interface. These wireframe images or screenshot images may be combined together on the overall image based on characteristics of the record of user interactions such that the connectors and graphical indicators in the video sequence generally flow in a single direction, minimize intersections, etc. Generating the image of the one or more user interfaces is described throughout this disclosure above, including in the description of FIGS. 3-5.

The method may additionally include determining locations on the image of the one or more user interfaces that correspond to the user interactions with the one or more user interfaces (806). These locations may be identified in a local coordinate system of the wireframe or screenshot of the user interface. These local coordinate systems may be translated into a global coordinate system for the overall image of the one or more user interfaces that is used as a canvas in the video sequence. In some embodiments, functions or routines in the display code for the user interfaces may be mapped to identifiers in events logged at the server in the record of user interactions. This may be used to tie specific user actions to locations in the image of the one or more user interfaces. Determining the locations on the image corresponding to the user interactions is described throughout this disclosure above, including in the description of FIGS. 3-5.

The method may further include generating a video sequence that animates the user interactions at the locations on the image of the one or more user interfaces (808). The animation may include graphical indicators that are animated as they move between start points and end points for each path segment in a journey table in the record of user interactions. The graphical indicators (e.g., spheres) may draw connectors or arcs between the start points and endpoints for these paths. The connectors and/or graphical indicators may be sized, colored, or otherwise altered visually based on characteristics of the underlying data in the user interactions. The animation may include multiple user journeys and may connect user interactions across a plurality of different user interfaces. The animations may include a number of features, such as thumbnail images of individual path segments, filters based on any aspect of the data in the record of user interactions, a moving timeline, indications of when individual user journeys have ended, and so forth. Generating the video sequence that animates the user interactions is described throughout this disclosure above, including in the description of FIGS. 6A-6D and FIG. 7.

It should be appreciated that the specific steps illustrated in FIG. 8 provide particular methods of representing interactions between users and user interfaces according to various embodiments. Other sequences of steps may also be performed according to alternative embodiments. For example, alternative embodiments may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 9:
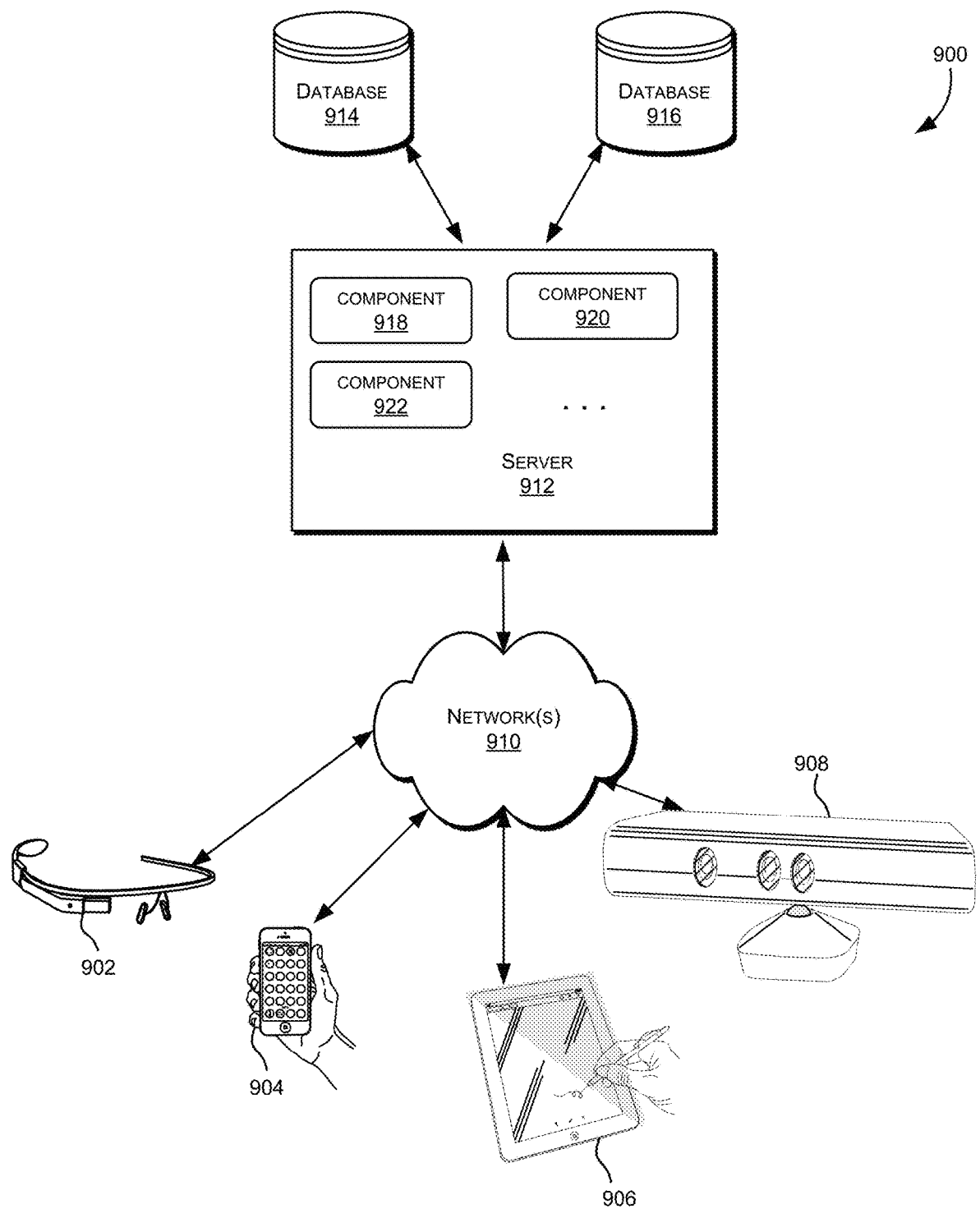
FIG. 9 illustrates a simplified block diagram of a distributed system for implementing some of the embodiments.

FIG. 9 depicts a simplified diagram of a distributed system 900 for implementing one of the embodiments. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various embodiments, server 912 may be adapted to run one or more services or software applications provided by one or more of the components of the system. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle, that are adapted to store, update, and retrieve data in response to SQL-formatted commands.

Figure 10:
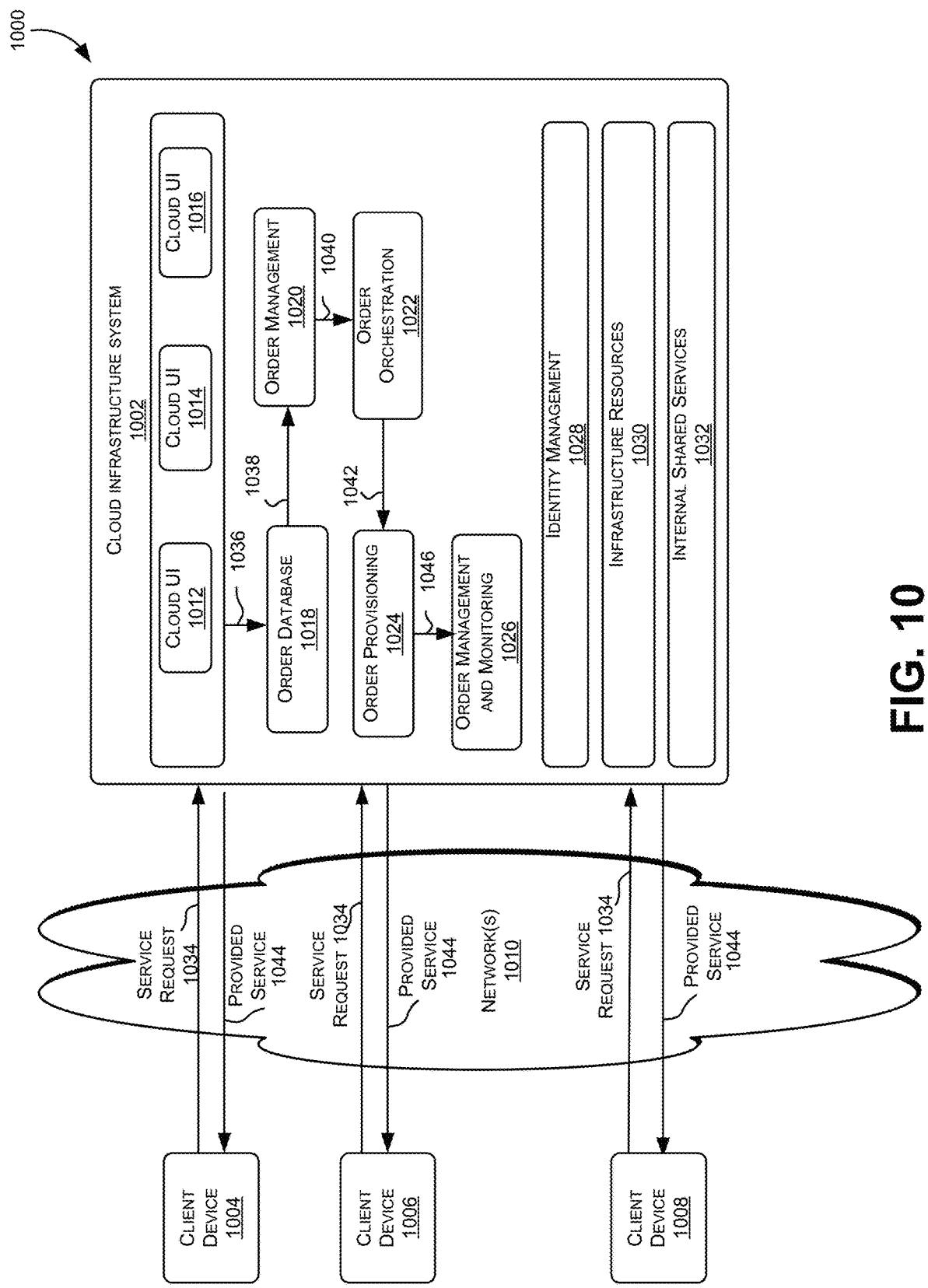
FIG. 10 illustrates a simplified block diagram of components of a system environment by which services provided by the components of an embodiment system may be offered as cloud services.

FIG. 10 is a simplified block diagram of one or more components of a system environment 1000 by which services provided by one or more components of an embodiment system may be offered as cloud services, in accordance with an embodiment of the present disclosure. In the illustrated embodiment, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the system shown in the figure is only one example of a cloud infrastructure system that may incorporate some embodiments. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network that can support data communications using any of a variety of commercially-available protocols, including those described above for network(s) 910.

Cloud infrastructure system 1002 may comprise one or more computers and/or servers that may include those described above for server 912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users and dynamically re-allocated per demand. Additionally, resources may be allocated to users in different time zones. For example, cloud infrastructure system 1030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 1018 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of business processes associated with each order and applies business logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006 and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain embodiments, cloud infrastructure system 1000 may include an identity management module 1028. Identity management module 1028 may be configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 11:
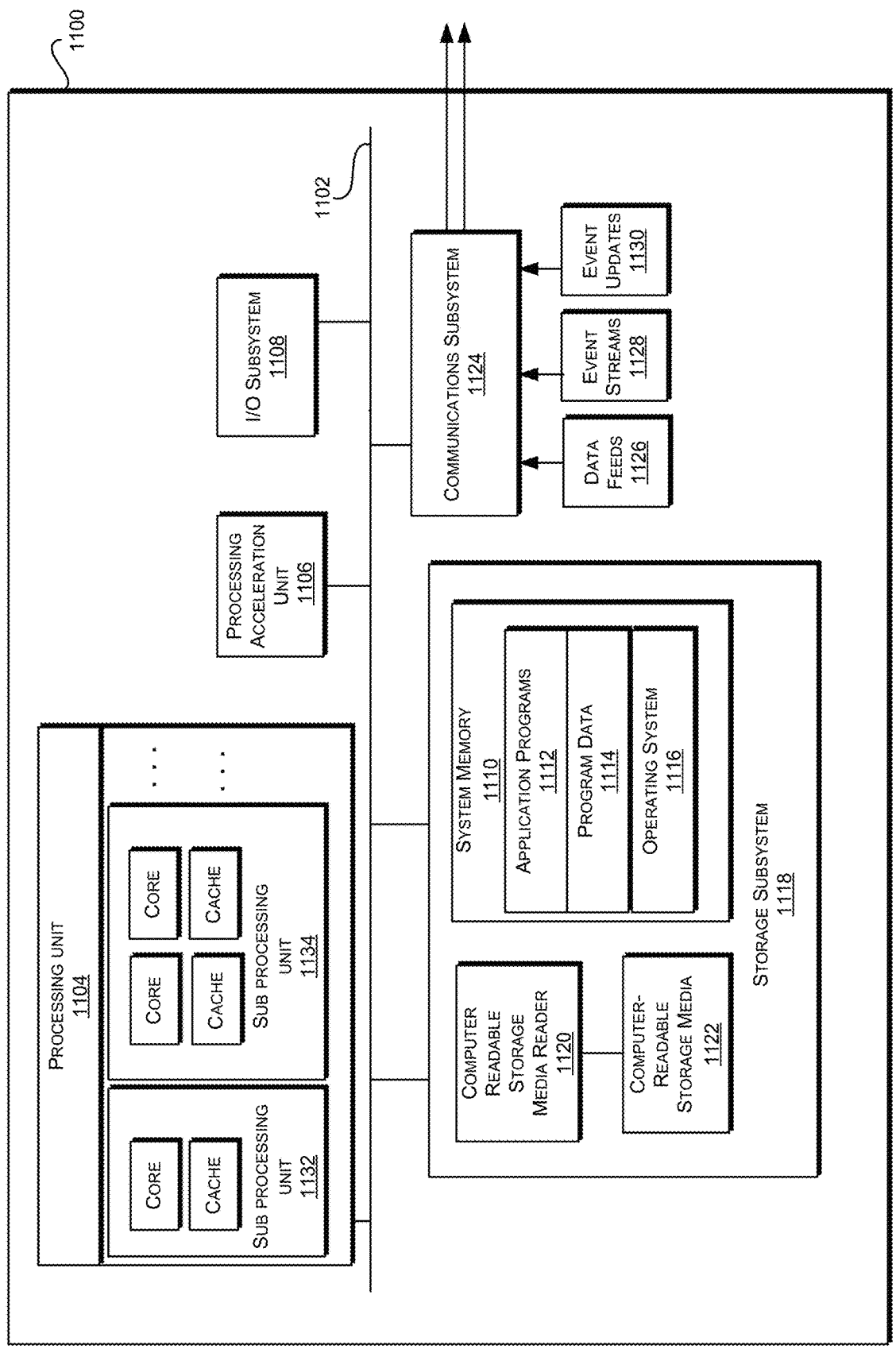
FIG. 11 illustrates an exemplary computer system, in which various embodiments may be implemented.

FIG. 11 illustrates an exemplary computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with some embodiments.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, cause the one or more processors to perform operations comprising:
    accessing a record of user interactions with a plurality of user interfaces with coordinate locations from the plurality of user interfaces where the user interactions were recorded;
    combining images of the plurality of user interfaces together into a combined image of the user interfaces;
    mapping the coordinate locations from the plurality of user interfaces to new coordinate locations on the combined image of the user interfaces;
    generating an animation from the record of user interactions that sequentially recreates the user interactions with the plurality of user interfaces by animating progress between the new coordinate locations on the combined image of the user interfaces; and
    generating a video sequence comprising the animation that sequentially recreates the user interactions with the plurality of user interfaces using the combined image of the user interfaces as a background for the animation.

2. The non-transitory computer-readable medium of claim 1, wherein the record of user interactions comprises a list of events registered at a server that cause the server to receive data entered through the plurality of user interfaces.

3. The non-transitory computer-readable medium of claim 1, wherein the plurality of user interfaces are presented to one or more users during a session with a software application.

4. The non-transitory computer-readable medium of claim 3, wherein the combined image of the user interfaces comprises a combination of a plurality of individual images of the plurality of user interfaces that are displayed together.

5. The non-transitory computer-readable medium of claim 1, wherein generating the combined image of the user interfaces comprises:
    accessing display code for the plurality of user interfaces;
    identifying graphical containers in the display code; and
    generating wireframe objects corresponding to the graphical containers.

6. The non-transitory computer-readable medium of claim 1, wherein generating the combined image of the user interfaces comprises combining screenshots of the plurality of user interfaces together into a single image.

7. The non-transitory computer-readable medium of claim 1, wherein the user interactions with the plurality of user interfaces comprises interactions received from a plurality of users who perform substantially a same sequence of interactions with the plurality of user interfaces.

8. The non-transitory computer-readable medium of claim 1, wherein the user interactions with the plurality of user interfaces comprises interactions received from a single user who repeats substantially a same sequence of interactions with the plurality of user interfaces across multiple user sessions.

9. The non-transitory computer-readable medium of claim 1, wherein the video sequence comprises displaying graphical indicators at locations on the combined image of the user interfaces indicating sequentially where the user interactions took place on the plurality of user interfaces.

10. The non-transitory computer-readable medium of claim 9, wherein the video sequence further comprises displaying connectors between the graphical indicators showing a path traveled by an input indicator along the connectors.

11. The non-transitory computer-readable medium of claim 10, wherein more than one of the connectors are displayed between a first graphical indicator and a second graphical indicator in the graphical indicators to show that multiple users traversed a path between the first graphical indicator and the second graphical indicator.

12. The non-transitory computer-readable medium of claim 10, wherein the connectors traverse between a plurality of individual images of the plurality of user interfaces in the combined image of the user interfaces.

13. The non-transitory computer-readable medium of claim 10, wherein generating the combined image of the user interfaces comprises arranging a plurality of individual images of the plurality of user interfaces such that the connectors flow in a single direction.

14. The non-transitory computer-readable medium of claim 10, wherein generating the combined image of the user interfaces comprises arranging a plurality of individual images of the plurality of user interfaces to minimize intersections of the connectors.

15. The non-transitory computer-readable medium of claim 9, wherein the graphical indicators are sized based on a number of users who provided user interactions at corresponding locations.

16. The non-transitory computer-readable medium of claim 1, wherein the operations further comprise calculating a representative times between the user interactions.

17. The non-transitory computer-readable medium of claim 16, wherein the video sequence animates the user interactions between the new coordinate locations on the combined image of the user interfaces based on the representative times between the user interactions.

18. The non-transitory computer-readable medium of claim 1, wherein the operations further comprise filtering the record of user interactions based on a subset of users or user interfaces before generating the video sequence.

19. A method of representing interactions between users and user interfaces, the method comprising:
    accessing a record of user interactions with a plurality of user interfaces with coordinate locations from the plurality of user interfaces where the user interactions were recorded;
    combining images of the plurality of user interfaces together into a combined image of the user interfaces;
    mapping the coordinate locations from the plurality of user interfaces to new coordinate locations on the combined image of the user interfaces;
    generating an animation from the record of user interactions that sequentially recreates the user interactions with the plurality of user interfaces by animating progress between the new coordinate locations on the combined image of the user interfaces; and
    generating a video sequence comprising the animation that sequentially recreates the user interactions with the plurality of user interfaces using the combined image of the user interfaces as a background for the animation.

20. A system comprising:
    one or more processors; and
    one or more memory devices comprising instructions that, when executed by the one or more processors, cause the one or more processors to perform operations comprising:
        accessing a record of user interactions with a plurality of user interfaces and coordinate locations from the plurality of user interfaces where the user interactions were recorded;
        combining images of the plurality of user interfaces together into a combined image of the user interfaces;
        mapping the coordinate locations from the plurality of user interfaces to new coordinate locations on the combined image of the user interfaces;
        generating an animation from the record of user interactions that sequentially recreates the user interactions with the plurality of user interfaces by animating progress between the new coordinate locations on the combined image of the user interfaces; and
        generating a video sequence comprising the animation that sequentially recreates the user interactions with the plurality of user interfaces using the combined image of the user interfaces as a background for the animation.

* * * * *